United States Patent
Rosenberg et al.

(10) Patent No.: US 8,306,016 B2
(45) Date of Patent: *Nov. 6, 2012

(54) SIGNALING METHOD FOR INTERNET TELEPHONY

(75) Inventors: Jonathan David Rosenberg, Freehold, NJ (US); Henning G. Schulzrinne, Leonia, NJ (US)

(73) Assignee: Alcatel Lucent, Paris (FR)

( * ) Notice: Subject to any disclaimer, the term of this patent is extended or adjusted under 35 U.S.C. 154(b) by 1438 days.

This patent is subject to a terminal disclaimer.

(21) Appl. No.: 11/134,424

(22) Filed: May 23, 2005

(65) Prior Publication Data
US 2005/0207361 A1 Sep. 22, 2005

Related U.S. Application Data

(63) Continuation of application No. 09/258,422, filed on Feb. 26, 1999, now Pat. No. 6,937,597.

(51) Int. Cl.
H04L 12/66 (2006.01)
(52) U.S. Cl. .................. 370/352; 709/227; 379/93.09
(58) Field of Classification Search ............. 370/352; 379/93.09; 709/227
See application file for complete search history.

(56) References Cited

U.S. PATENT DOCUMENTS

| | | | |
|---|---|---|---|
| 4,125,748 A | 11/1978 | Nahabedian et al. | |
| 5,008,930 A | 4/1991 | Gawrys et al. | |
| 5,590,186 A | 12/1996 | Liao et al. | |
| 5,590,187 A | 12/1996 | Greenspan | |
| 5,661,790 A | 8/1997 | Hsu | |
| 5,884,032 A | 3/1999 | Bateman et al. | |
| 5,915,010 A | 6/1999 | McCalmont | |
| 6,035,190 A | 3/2000 | Cox et al. | |
| 6,161,134 A * | 12/2000 | Wang et al. | 709/220 |
| 6,292,549 B1 | 9/2001 | Lung et al. | |
| 6,351,464 B1 | 2/2002 | Galvin et al. | |
| 6,377,944 B1 | 4/2002 | Busey et al. | |
| 6,434,143 B1 * | 8/2002 | Donovan | 370/356 |
| 6,445,695 B1 * | 9/2002 | Christie, IV | 370/352 |
| 6,493,447 B1 | 12/2002 | Goss et al. | |
| 6,564,261 B1 * | 5/2003 | Gudjonsson et al. | 709/227 |
| 6,584,490 B1 * | 6/2003 | Schuster et al. | 709/200 |
| 2001/0040945 A1 * | 11/2001 | Fujino et al. | 379/93.09 |

OTHER PUBLICATIONS

Handley, SIP: Session Initition Protocol, Internet Engineering Task Force, Jul. 31, 1997, pp. 1-62.*
The International Engineering Consortium, "H.323 Protocol Summary", Sep. 8, 1998.
Handley et al., Internet Engineering Task Force, "Sessional Initiation Protocol", Jan. 15, 1999.

* cited by examiner

*Primary Examiner* — Ricky Ngo
*Assistant Examiner* — Phuongchau B Nguyen
(74) *Attorney, Agent, or Firm* — Harness, Dickey & Pierce

(57) ABSTRACT

A method for creating, modifying, and terminating connections between Internet end systems, particularly, although not exclusively, for Internet telephony communication. The method relies on several request messages sent between a client and a server and the response messages sent back in response. Each request and response message may contain one or more header fields which modify or more uniquely link the messages with a given connection. On this basis, advanced telephony services, such as call forwarding, call transferring, and multiparty conferencing are provided.

6 Claims, 7 Drawing Sheets

```
INVITE:  sip:user@company.com SIP/2.0
    TO: sip:user@company.com
    FROM:     sip:caller@university.edu
    CALL-ID:    1234@123.54.33.12
    CALL-DISPOSITION:do_not_forward
    REQUESTED BY:sip:professor@university.edu
    ALSO:sip:dept-chair@university.edu
```

SIGNALING METHOD FOR INTERNET TELEPHONY

PRIORITY INFORMATION

This is a continuation of U.S. application Ser. No. 09/258,422, filed Feb. 26, 1999 now U.S. Pat. No. 6,937,597; the contents of which is hereby incorporated by reference in its entirety.

BACKGROUND OF THE INVENTION

1. Field of the Invention

The present invention relates to a method for creating, modifying, and terminating associations between Internet end systems, particularly, but not exclusively, in connection with Internet telephony communication. The method is particularly contemplated for use in a client-server architecture on the Internet. In addition, the method is particularly contemplated for use in Internet telephony communication so as to provide relatively advanced telephony services, beyond call construction and destruction, such as call forwarding and transfer, call holding, camp-on queuing, and also three or more party conferencing.

2. Background of the Invention

Internet telephony, or, simply, the use of the Internet for telephone-like multimedia communication is becoming increasingly common, especially with increased home and office access to the Internet. However, in order to become as versatile as conventional telephone communication (i.e., in a public switched telephone network, or PSTN), Internet telephony must be able to offer comparable, or even improved service functionality.

In conventional telephone communication, a first party indicates to a second party that a connection is sought by simply dialing the second party's telephone number (which is, in effect, an "address" as discussed hereinbelow), whereby the second party's telephone rings to indicate that the first party is calling (i.e., trying to establish a connection for communicating). In most cases, the signaling (i.e., the telephone ringing) is tied to an attempt to establish a telephone connection (i.e., a ringing telephone indicates an attempt at a connection between the caller's telephone and the ringing telephone).

In Internet telephony, therefore, a first party must also have a corresponding way to locate a second party and signal the first party's desire to communicate. This functionality is generally known as "Internet telephony signaling" and is generally enabled by the use of one or more commonly used protocols, such as the Session Initiation Protocol ("SIP").

Internet telephony signaling functionality may include several functions, generally, such as:

name translation and location: mapping between names at different levels of abstraction (e.g., a common name at a particular Internet domain, and an individual user name at a particular Internet host);

feature negotiation: allowing end systems to agree on what media to exchange and their respective parameters, such as encodings (which need not be uniform within a call, as different point-to-point sessions may involve different media and media parameters);

call participant management: allowing any call participant to invite others into an existing call and terminate associations with some (including transferring and holding other callers); and feature changes: allowing adjustment of the composition of media sessions during the course of the call (e.g., if call participants require more or less functionality, or if constraints are added or removed by the addition or removal of call participants over the course of a call).

It is important to note that the foregoing functions may be addressed by more than one protocol. For example, H.323 (another common protocol) may be used to establish sessions between an end system and a gateway, whereas SIP may be used for gateway-to-gateway signaling.

SUMMARY OF THE INVENTION

The present invention is therefore a method for, most generally, creating, and also modifying and terminating, associations between Internet end systems, especially for Internet telephony. However, the present invention may also be applied to, for example, video, online text "chatting," collaborative browsing, and application sharing.

In particular, the present invention is a method for providing one or more relatively advanced telephony services (i.e., services beyond basic call construction and destruction), including, without limitation, multiparty calling, call transferring, camp-on call queuing, call holding, reach first calling, reach all calling, etc. The method according to the present invention is particularly advantageous for its addressing of issues of data transport compatibility between the end systems by concentrating functionality in respective end systems in order to minimize the data transport considerations over the Internet.

A method according to the present invention provides the foregoing telephony services using a conveniently small number of tools (called "primatives") defined in SIP, which is embodied in a commonly used client-server communication architecture. SIP is similar to the HTTP model of clients and origin and proxy servers. Like HTTP, SIP is based on a request-response model. SIP is textual and utilizes information held in various header fields (discussed hereinbelow).

SIP works without regard to conference size, whether calling a single party in the common two-party call, setting up a small conference, or inviting a participant into an existing multicast session.

BRIEF DESCRIPTION OF THE DRAWINGS

The present invention will be described in detail hereinbelow with reference to the drawings appended hereto, wherein.

DETAILED DESCRIPTION OF THE PRESENTLY PREFERRED EMBODIMENTS

Figures 1, 2:
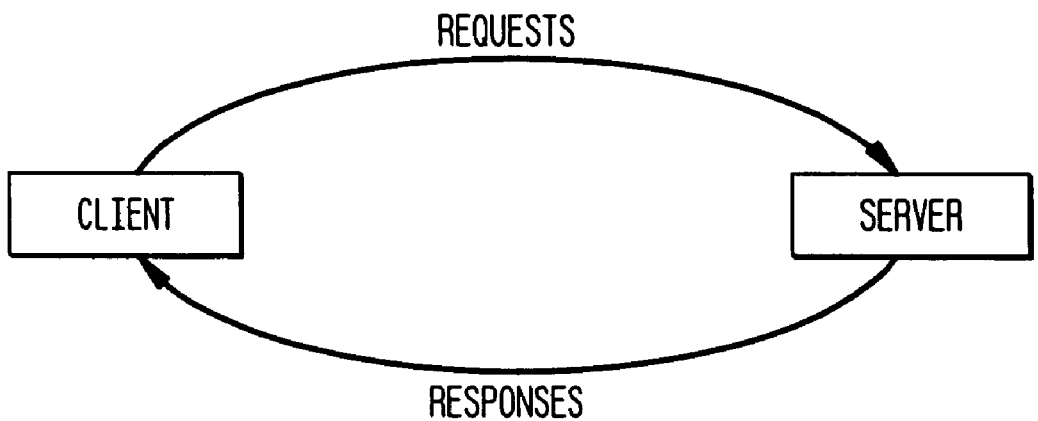
FIG. 1 is a simplified schematic illustration of the relationship between clients and servers and the exchange of requests and responses therebetween.
FIG. 2 is an illustrative representation of a request message (in this case an INVITE request message), illustrating an example of a plurality of header fields associated therewith.

Presently preferred embodiment(s) of the present invention will be described in detail hereinbelow.

It is presently contemplated that the methods according to the present invention are to be effected in accordance with SIP. Accordingly, a discussion of SIP is appropriate here by way of overview.

SIP is a client-server protocol, in which a client issues requests, and a server returns responses. In Internet telephony, several servers and clients may be involved, as requests may be forwarded, as discussed below. The SIP model is similar to the HTTP model of clients and origin and proxy servers. By using HTTP as a base, SIP can immediately reuse several evolving protocols for, for example, electronic commerce, authentication, content labels and client-side access control, protocol extensions, state management, and content negotiation. Also, servers, proxies, firewalls, and the like can be easily adapted from HTTP to SIP.

As in HTTP, client-originated requests invoke methods on the server. Requests and responses are textual, and contain various header fields which convey call properties and service information. Indeed, SIP reuses many of the header fields used in HTTP, such as the entity headers and authentication headers, specifically to simplify integration of SIP servers and HTTP servers.

Calls in SIP have the following properties:

1. a logical call source indicates the entity that is requesting the call (i.e., the originator). This may not be the entity that is actually sending the request, however, as proxy servers may send requests on behalf of other users. In SIP, the logical call source is indicated in the FROM header field.

2. a logical call destination indicates the party whom the originator wants to contact. This property is contained in the TO header field.

3. a media destination conveys the location (i.e., the IP address and port) where the media (e.g., audio, video, data) are to be sent for a particular recipient. This address is sometimes not the same address as the logical call destination. For example, it may be desirable to send, for example, audio to a different address than the address to which data is sent. Media destinations are carried as part of the body or payload of a SIP message.

4. media capabilities is another property that conveys the media that a party is able to receive and their attributes or operating parameters. Like the media destination, media capabilities are transmitted as part of the body or payload of a SIP message. The Session Description Protocol (SDP) is currently used as the common format for media destination and media capabilities information. SDP expresses lists of capabilities for audio and video and indicates where the media are to be sent.

In general, each call is identified by a globally unique call identifier, carried in a CALL-ID header field of the SIP message. The call identifier is created by the originator and is used commonly by all call participants. The call identifier may be, for example, an alphanumeric or numeric string corresponding to the day and/or time of a call, which is associated with some identifier specific to the call originator.

As mentioned above, SIP defines several methods. These may include the following.

INVITE invites a user to a conference, BYE terminates a connection between two users in a conference, and OPTIONS solicits information about a user's capabilities, but does not set up a call. Accordingly, these methods are used to manage or prepare for calls.

In addition, STATUS informs another server about the progress of signaling actions that it has requested by way of the ALSO header field. ACK is used for reliable message exchanges for invitations. Finally, REGISTER conveys location information to a SIP server.

As mentioned above, SIP advantageously makes minimal assumptions about the underlying transport protocol being used for Internet telephony, especially with regard to reliability. It can use any datagram or stream protocol. The only restriction on function is that a SIP request or response must be transmitted in full or not at all. SIP can therefore be used with UDP or TCP in the Internet, and with X.25, AAL5/ATM, CLNP, TP4, IPX, or PPP elsewhere. Network addresses within SIP are not restricted to being Internet address, but could also be E. 164 PSTN addresses (i.e., conventional telephone numbers), OSI addresses, or even privately created numbering plans.

In addition, it should be noted that SIP is not tied to the existence of a TCP connection, so that a call can be maintained even if a calling party loses their Internet connection and must reboot, as long as the respective end systems can maintain call identifiers associated with the call.

First, the issue of user addresses and naming will be discussed.

In order to be invited to a call, the called party must have an identification by which it can be addressed. Since the most common form of user addressing on the Internet is the email type address, SIP uses party identifiers in the form of, for example, "user@domain," "user@host," "user@IP_address," or "phone_number@gateway."

The domain name can be either the name of the host that a user is logged into at the time, an email address, or the name of a domain-specific name translation service. As can be expected, an address in the form of "phone_number@gateway" designates a PSTN phone number reachable via the named gateway.

SIP uses these addresses as part of SIP URL's, such as "sip:j.doe@example.com." Such URL's may, of course, be placed in a web page as a link, whereby clicking on the URL initiates a call to that address, similar to the manner known to send an email to an address shown as a link on a web page.

It is particularly contemplated that most users will be able to use their email addresses as their SIP address as well. In particular, email addresses already offer a basic address form which is independent of user location, in that the address does not have to designate a particular Internet host, but can be instead a domain, which is then resolved into one or more possible domain mail server hosts via DNS MX ("mail exchange") records. This advantageously permits reuse of existing directory services such as LDAP, DNS MX records, and email as a last-ditch means of delivering SIP invitations.

For email, finding the mail exchange host is usually sufficient for delivering mail, as the user either logs on to the mail exchange host of uses protocols such as IMAP or POP to retrieve mail. However, for interactive audio and/or video communication, as contemplated here, participants are typically sending and receiving data on the workstation, PC, or other Internet terminal in their immediate physical proximity. Therefore, SIP must be able to resolve "name@domain" to "user@host," either immediately or with one or more translations. For example, a single externally visible host may correspond to a different host depending on the time of day, media being used, or any of a number of other factors. Also, the fact that dial-in users can acquire a different IP address for each login must be taken into account.

The discussion of addressing necessarily raises the issue of directory services. In this regard, DNS permits a one-to-many mapping from a globally unique, hierarchical identifier to one or more host names or IP addresses. Lookups are by a single primary key only, however, not generalized Boolean queries relative to several parameters. For these reasons, DNS is not well suited for looking up individual subscribers. DNS can, however, be used by SIP to map the name of a domain to the name of a server for a specific request, and, further, the published SIP address from the details of the Internet service provision.

On the other hand, LDAP is a true directory service which enables searching of attributes to a record. It can, for example, answer a suitably posed query to the effect of "what are the records matching a name Smith, residing in New York City, that are older than 40 years?" While this is suitable for obtaining a globally unique user "handle" from a set of attributes, it would appear to be used with a frequency comparable to telephone directory services. For regular calls, it is too cumbersome to provide sufficient information to obtain a small set of response from the global set of available network addresses to always use this system to place calls. However, SIP servers can use LDAP servers, for example, to look up matches for "John.Smith" or "J.Smith" or "Smith" in a corporate directory database accessed via LDAP and return possible choices.

SIP can also provide a "programmable" directory service, where a response depends on the identity of a caller, the type of media that is to be sent or to be received, the time of day of the call, the number of other calls in which the called party is currently engaged, or any other factor deemed pertinent by the server. However, such dependencies are not easily cast on the framework of a relational database, especially because the combination of attribute values is large, but sparse. Also, unlike a database, where updates tend to be infrequent at best and require action by an outside entity, a SIP response may yield different results with each call, as discussed above, without any intervention by the party being called. On the other hand, there is no set query language used, but the server chooses which parameters of the call to interpret in handling a call. Such call handling programs may be stored, for example, in a database for large user populations.

The basic operation of Internet telephony signaling using SIP is discussed hereinbelow.

The most important operation in SIP is that of inviting new participants to a call, whether a second party in a two-party call, or third or later parties in a conference or multicast call. All other operations in SIP are essentially built on the operation of inviting additional callers.

Briefly, a caller first obtains an address where a callee is to be called (using, for example, LDAP, as discussed above), in the form name@domain. The domain is then translated, as necessary, to an IP address where a suitable server is located. This translation involves, in sequence, DNS SRV records of sip.udp and sip.tcp type, MX, CNAME, and finally, A records. Once the server's IP address is located, the caller sends an INVITE message, using either UDP or TCP.

The server receiving the INVITE message is usually not the host where the callee is actually located. Therefore, we define three types of servers: proxy, redirect, and user agent.

Figure 3:
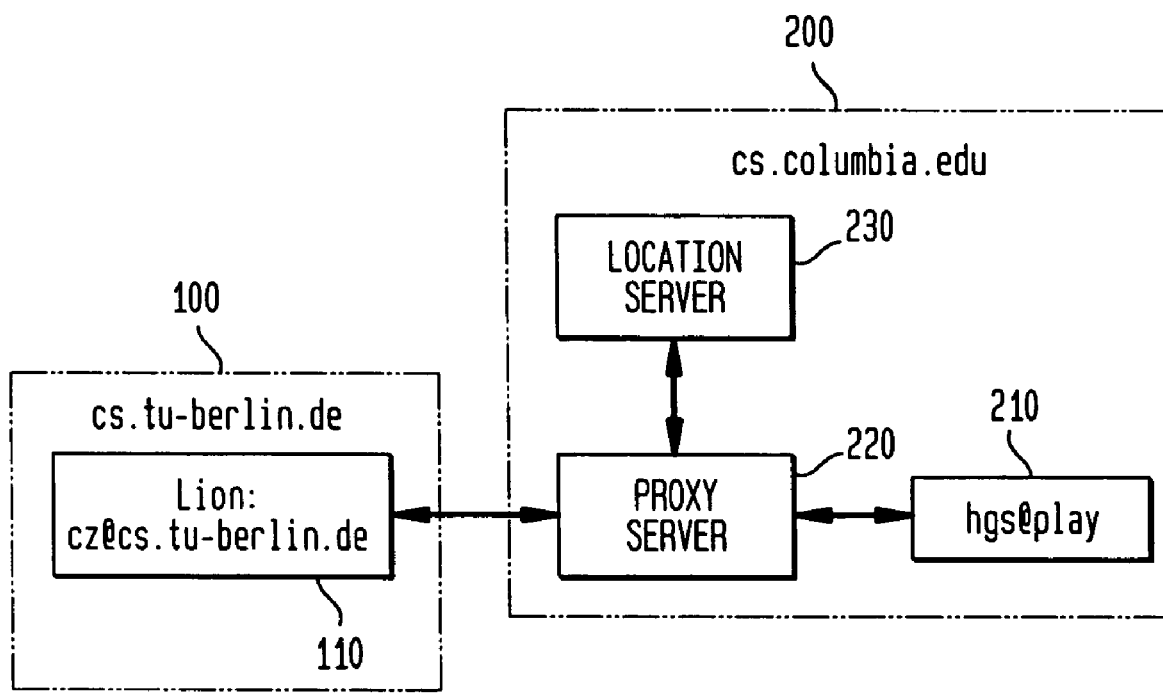
FIG. 3 is schematic illustration of the relationship between a client and a proxy server.
Figure 4:
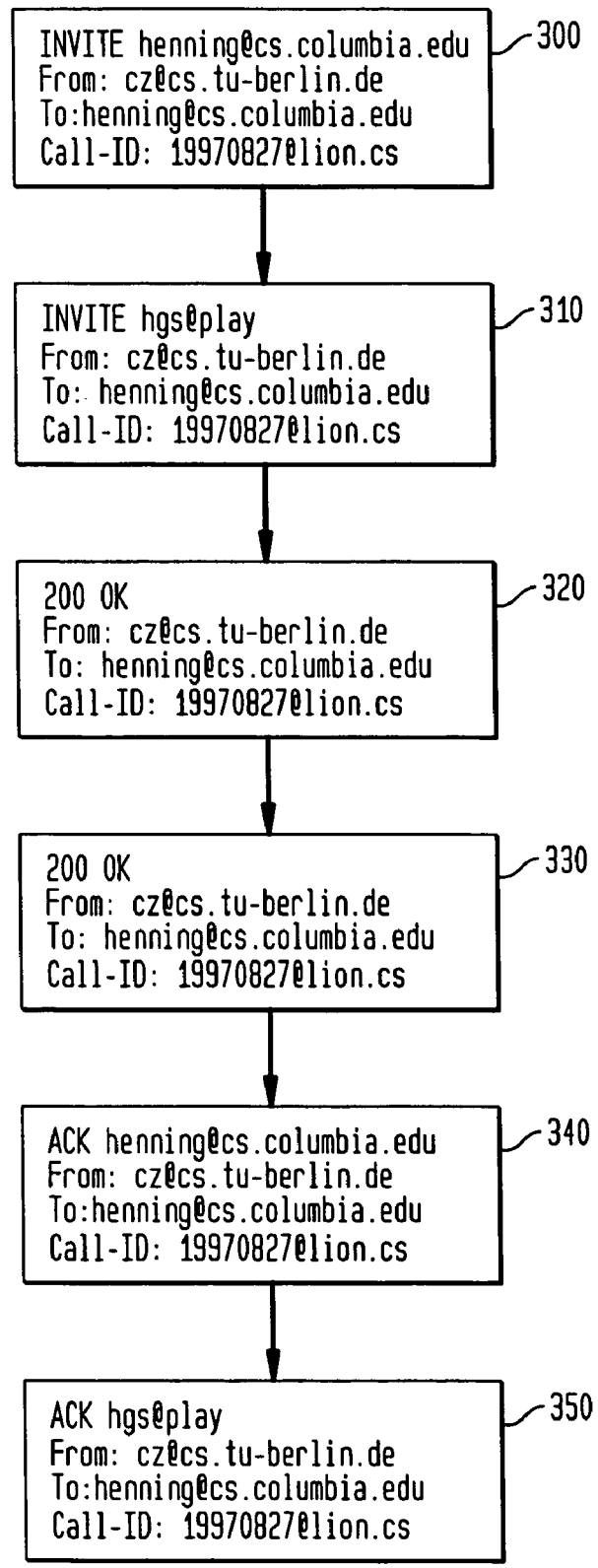
FIG. 4 illustrates a call set up according to SIP in a proxy server environment.

FIG. 3 schematically illustrates a client-server environment including a proxy server. FIG. 4 illustrates an exchange of requests and responses in a client-proxy server environment, using the arrangement illustrated in FIG. 3.

In general, a proxy server receives a request (such as an INVITE message) and then forwards the request towards (i.e., not necessarily to) the current location of the callee. For example, the server responsible for the domain example.com may forward a call for john.doe@example.com to the server responsible for the address doe@sales.example.com. A VIA header field traces the progress of the request (in this case, the INVITE message) from server to server, allows request responses to find their way back through the sequence of servers, and helps detect infinite loops. A proxy server can also forward an incoming invitation to multiple servers simultaneously, in order to try to contact the user at one of the locations. A proxy server can also forward an invitation to multicast groups, effectively contacting multiple next hops efficiently.

FIG. 3 illustrates two domains 100 and 200, cs.tu-berlin.de and cs.columbia.edu, respectively.

According to the illustrated example, user cz (110) wants to communicate with user henning (210). Accordingly, client cz@cs.tu-berlin.de sends an INVITE request 300 (see FIG. 4). As seen in step 300, the INVITE request is "addressed" to henning@cs.columbia.edu, and includes a FROM header field (From: cz@cs.tu-berlin.de) and a CALL-ID header field (19970827@lion.cs, where "lion" identifies a particular host at domain cs.tu-berlin.de 100).

The INVITE request is received by proxy server 220 at domain cs.columbia.edu 200. The proxy server 220 may, for example, send the target "henning" to a location server 230, which returns a location of "hgs@play" to the proxy server 220 as the location of user henning.

In step 310, therefore, proxy server 220 sends a new INVITE request to hgs@play. As in step 300, this INVITE request also contains FROM, TO, and CALL-ID header fields. It is particularly noted that the call identifier in the CALL-ID header field is the same, in order to maintain an association with the original request.

In step 320, hgs@play 210 returns a response of OK to proxy server 220 (coded with a response code 200, indicating successful transmission). In turn, the proxy server 220 forwards a corresponding OK response to cz@cs.tu-berlin.de (step 330). These OK responses are acknowledged by acknowledgement messages ACK sent from cz@cs.tu-berlin.de to proxy server 220 (step 340) and from proxy server 220 to hgs@play (step 350).

A redirect server receives a request and informs the caller (i.e., client) of the next hop server. The caller then contacts the next hop server directly.

Figure 5:
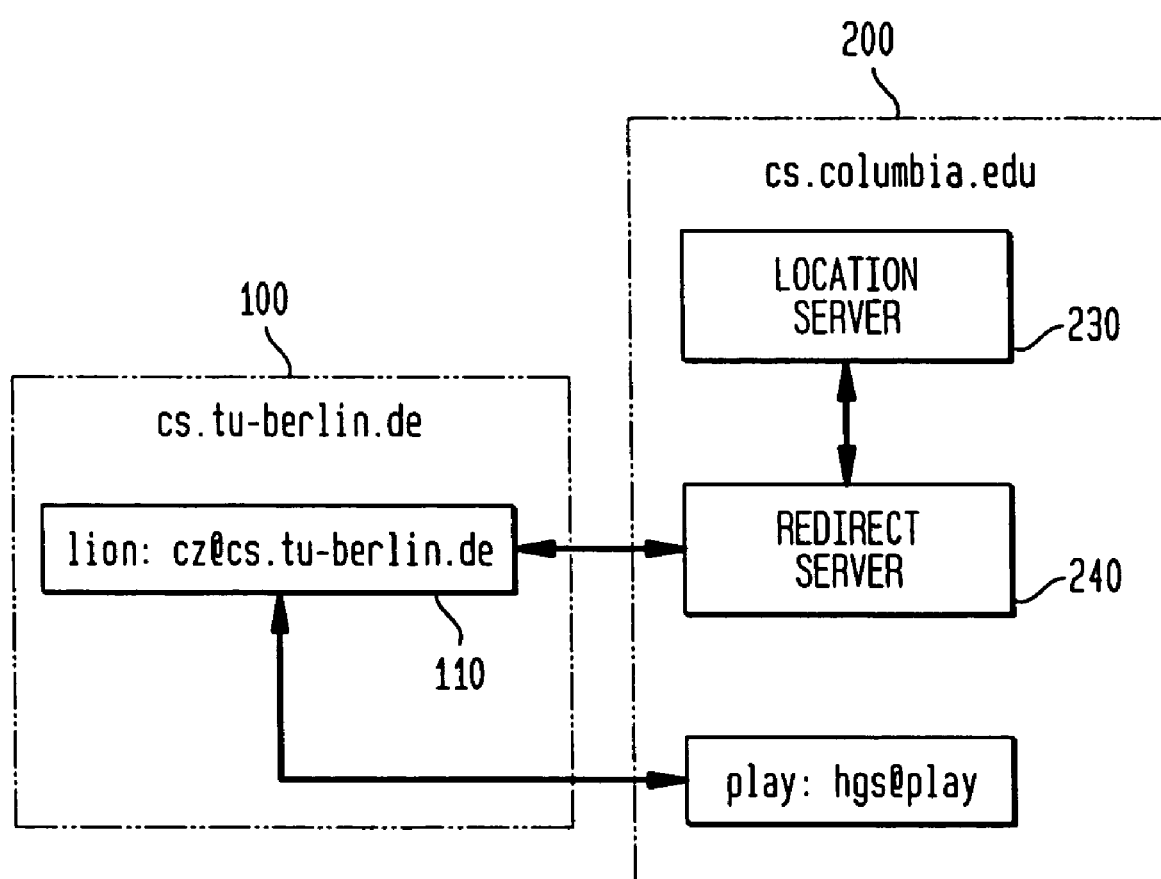
FIG. 5 is a schematic illustration of the relationship between a client and a redirect server.
Figure 6:
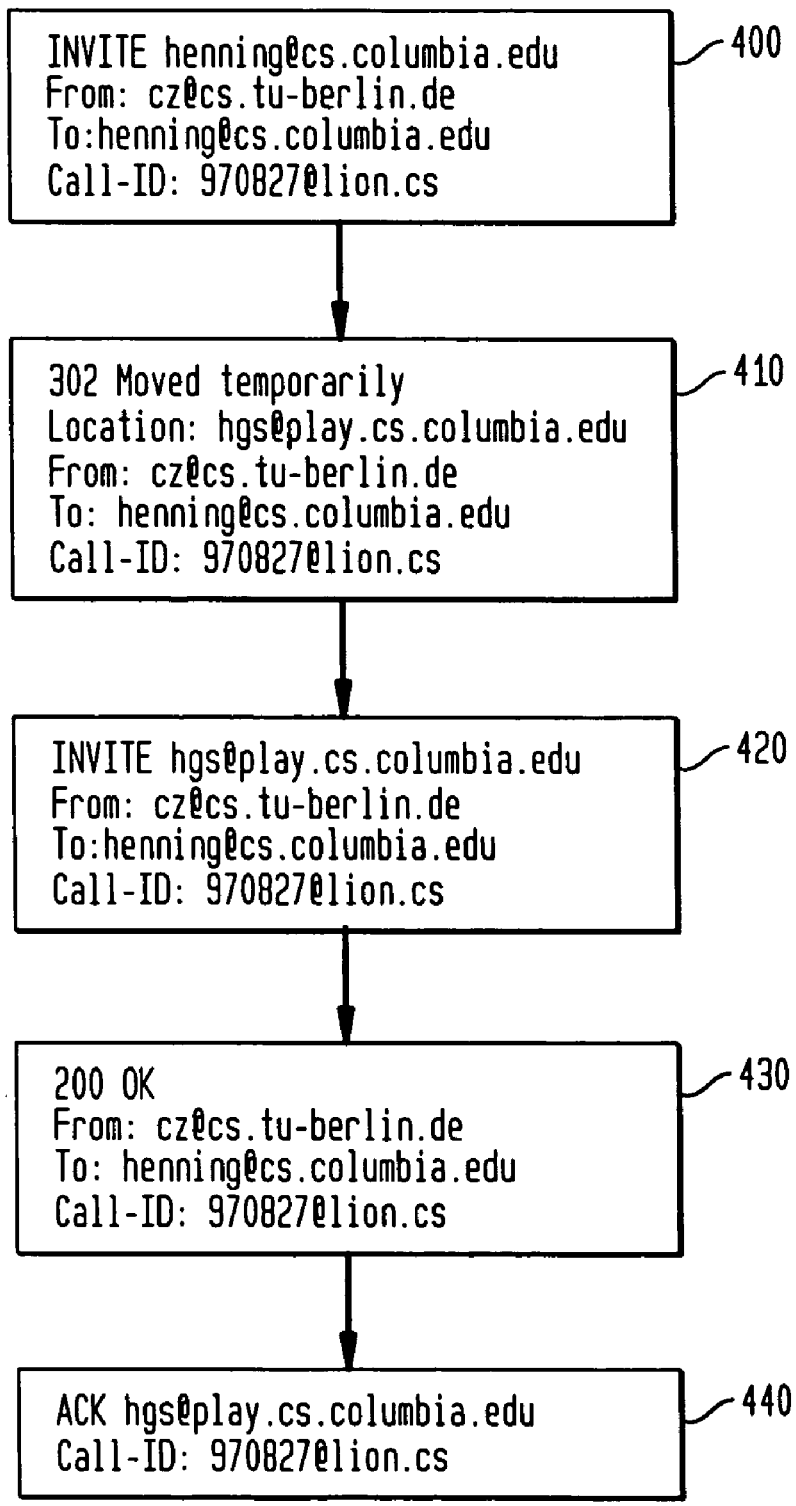
FIG. 6 illustrates a call set up according to SIP in a redirect server environment.

FIG. 5 illustrates a client-server environment using a redirect server, and FIG. 6 illustrates a process by which a caller is directed to a desired user by way of a redirect server.

As in FIG. 3, FIG. 5 illustrates domains cs.tu-berlin.de (100) and cs.columbia.edu (200). Again, user cz in domain cs.tu-berlin.de wants to contact user henning in domain cs.columbia.edu.

In step 400, client cz@cs.tu-berlin.de sends an INVITE request addressed to henning@cs.columbia.edu. The INVITE request includes header fields, as before, including a CALL-ID header field containing a call identifier.

The difference here is that redirect server 240 responds to the INVITE request in step 400 by indicating in step 410 (after, for example, processing the INVITE request in a location server 230) that henning@cs.columbia.edu has moved temporarily to hgs@play.cs.columbia.edu (which information is contained in a CONTACT field header of the response). The moved temporarily response has a response code of 300, indicating redirection.

Thereafter, in step 420, client cz@cs.tu-berlin.de sends another INVITE, this time addressed to hgs@play.cs.columbia.edu, as directed by the redirect server. Note that this INVITE request contains the same CALL-ID call identifier as in the original INVITE request, so as to be recognizable as part of the same calling process.

In turn, client hgs@play.cs.columbia.edu responds in step 430 with an OK message (having a response code of 200), to which cz@cs.tu-berlin.de sends back an ACK request (step 440).

A user agent server resides on the host where the user is situated. It is capable of querying the user about what to do with an incoming call: accept, reject, or forward. Once the user agent server has been contacted, it sends a response back to the requesting client. The response has a response code (between 100 and 600, similar to HTTP) and a response message.

Unlike other requests, a call invitation usually cannot be answered immediately, as locating a callee and waiting for an answer may take at least several seconds. Calls may also be queued, such as if the callee is busy.

Response codes were mentioned above. Response codes of the 100 class (denoted as 1xx) indicate call progress. Responses in the 100 class are always followed subsequently by other responses indicating the final outcome of the request. In this regard, 1xx responses are provisional (i.e., will later change once a call is answered, not answered, etc.). Other response classes indicate the final status of a call invitation: 2xx for success, 3xx for redirection, 4xx, 5xx, and 6xx for client, server, and global failures, respectively. In addition, 3xx responses include, in a CONTACT header, other locations where a callee might be contacted.

In all response code classes, the response is always sent to the entity which sent the message to the server, and not (necessarily) to the originator of the request.

To ensure reliability, even with possibly unreliable transport protocols, the server retransmits final responses to INVITE requests until the client confirms receipt thereof with transmission of an ACK request to the server. For requests other than INVITE, the client retransmits the request every (for example) 5.0 seconds until a response to the request is received. A server retransmits the response every time a retransmission of the request is received.

All responses may also include more detailed information. For example, a call to a central company "switchboard" address could return a web page that includes links to the various departments in the company.

In view of the foregoing, reliability is achieved by having the client retransmit requests every 1.0 seconds until either a progress report (i.e., 1xx) or final status ($\geq 200$) response is received. Usually, a server will respond immediately with a progress report (or possibly an error indication) upon receipt of an invitation, but then make take a considerable amount of time to return a final status response (e.g., while a phone is ringing). The server likewise retransmits responses until the client acknowledges receipt with an ACK request. In effect, this amounts to a three-way handshake similar to setting up a TCP connection, requiring a total of 1.5 round-trips and 3 messages to set up a call if no packets are lost. Pending invitations can be cancelled with a CANCEL request.

It will be appreciated that if requests are retransmitted only periodically (i.e., much longer than 1.0 second apart, as discussed above), then a callee has no quick way to know that a call attempt has been aborted.

If responses are not retransmitted in the manner discussed above, then a callee might pick up a call, expecting to find a media connection, but the caller would not know that the callee has picked up until the next retransmission of the invitation since the caller's application would still be generating a ring-back. If retransmissions are spaced closely enough (about a second apart), a single call attempt could generate dozens of invitation packets, increasing network traffic and impacting all servers in the communication path.

Simply retransmitting responses without an ACK message adds additional network overhead, since the callee has no way of knowing when it can stop retransmitting responses. This also makes implementation of long-duration connection attempts (such as for call queuing, discussed hereinbelow) very inefficient and difficult.

Thus, the ACK request primarily avoids unnecessary retransmission of responses, but also avoids a "race" condition where the caller hangs up just as the callee picks up the call. The callee would not enable transmission of data until the ACK request is received.

There is no "acknowledgement of acknowledgement" problem because any response to the ACK request has no significance for either side in the client-server relationship. A response to an ACK request could be sent, if merely for reasons of symmetry with other types of requests, but such is not required. The server simply retransmits the original final status response until an ACK is received. The client retransmits an ACK for every final status message ($\geq 200$).

By using application-layer reliability instead of TCP, timers can be advantageously adjusted according to the requirements of a signaling application rather than being at the mercy of a kernel protocol stack. For example, standard TCP retransmits SYN packets after 6 and 24 seconds, which is too long of a post-dial delay if a packet is lost. TCP features such as flow- and congestion-controlled reliable byte streams are not particularly helpful, since SIP messages are usually short and sporadic. Unlike TCP, the problem with sequence number reuse is avoided by assigning each call an identifier which is unique across all hosts and is never re-used in time. Servers are required to support both UDP and TCP, while a think client such as a standalone "Internet telephone" may only support UDP.

Protocol operation is simplified by making each request idempotent; that is, the recipient of a request simply checks if it has already executed the required action. Thus, for example, if a caller changes his or her mind as to details of a call invitation in the process of making the invitation, then the latest request (reflecting the desired changes in the parameters of the request) is used.

SIP is designed under the assumption that additional signaling capabilities will be required in the future in view of the evolving nature of Internet telephony. In general, SIP is designed so that a client can either inquire about a server's capabilities or assume that the server supports a given extension, and withdraw a request if that assumption is incorrect.

Accordingly, a server will signal an error if a method requested by a client is not supported. The client is then informed about methods that are supported by way of ALLOW response headers. The OPTIONS request also returns a list of available and supported methods.

As in HTTP or SMTP, the client and server in SIP can add request and response headers which are not crucial to interpreting the request or response, without explicit indication of having done so. The client or server receiving the header in question simply ignores headers which are not understood without any other reaction. In order for the client to include headers that are vital to interpreting a request, a REQUIRES header is used to indicate features that the client needs to know from the server. In particular, a server is required to refuse a request if one of the features (i.e., headers) enumerated is not understood by the server.

Feature names are standardized by, for example, registration with the Internet Assigned Numbering Authority, or by deriving them hierarchically from the feature owner's Internet domain name, giving hints as to where further information can be found. SIP uses this to ascertain whether telephony call control functions are supported, avoiding a problem of partial implementations that have unpredictable sets of optional features.

Finally, response codes returned in responses are classified according to their most significant digit, as discussed above, so that the client knows if a request was successful, failed temporarily, or failed permanently. A text status message offers a fallback mechanism that allows the server to provide more easily human readable information.

Another important issue for signaling is security, especially authentication mechanisms. This is important to prevent call spoofing, denial-of-service attacks, and the telephonic equivalent of unsolicited commercial mail (i.e., "junk mail"). It must be remembered that traditional means of protecting telephonic privacy, such as providing unlisted telephone numbers, are not applicable here as long as email addresses remain essentially public.

In accordance with its use of an HTTP framework, SIP can use standard HTTP authentication mechanisms, such as basic (i.e., clear text password) and digest (challenge-response). SIP additionally supports cryptographically strong authentication based on public key algorithms, such as PGP and S/MIME.

The developmental model for telephony services using SIP is substantially different from other telephony architectures such as H.323 and Q.931, primarily because of the need for extensibility and growth. In particular, the present invention is directed to the fact that the Internet has thrived because it has permitted rapid development and deployment of new applications, particularly without the need for centralized control or "forklift upgrades" of a broad scope of all systems involved.

Accordingly, using SIP, a set of tools at the disposal of a SIP client has been defined in order to construct services, such as telephony services. These tools are used as discussed hereinbelow to provide the desired "advanced" telephony services.

As discussed above, three request methods can be used as tools to create or otherwise implement services: INVITE, BYE, and OPTIONS. The other SIP request methods are not used to create services, at least directly.

Another type of tool is the header fields contained in the requests, including CALL-DISPOSITION, ALSO, CONTACT, and REPLACES. Each header field causes the SIP server to perform a well-defined and predictable operation. Likewise, server behavior in response to a combination thereof is also well-defined. As discussed above, there are other header fields, but those are either independent of the header fields used for call services (e.g., authentication headers), or simply provide additional information which may be needed for call services (e.g., call-identification).

The header fields and message types are orthogonal, such that the semantics defined for the four call service header fields mentioned are independent of which request or response message that they appear in. This advantageously simplifies implementation and allows for richer service offerings.

The tools discussed here essentially permit construction and destruction pieces of a call mesh, where the mesh represent endpoints involved in the call (each of which may be users, bridges, media players, or any other relevant device), and the branches therebetween represent logical connections which have been established between them.

The message tools, as discussed above, are INVITE, BYE, and OPTIONS. Each of these request messages are sent from a client to a server, whereby the server responds in a manner that permits construction of a variety of services.

The INVITE request indicates that the client wants to establish communication, or change some aspect of the communication with a respective server. The server knows which is the case based on the CALL-ID field in the message. If the CALL-ID field reflects a new call identifier (i.e., the server is not currently handling any other call with that call identifier), then the call is known to be new. If the CALL-ID field contains a call identifier that is already known, and the originator of the INVITE request is already in the call, then the request message is either a duplicate (known by a CSEQ field, which is a simple sequence number), or contains an update about the call. An update of this type is usually executed silently by the server, without otherwise notifying the user since the user has already accepted the call in question. If the CALL-ID value is not new, but the originator of the request is not in the call, then a new party is being added to the call.

The BYE request message indicates that the client wants to terminate communication with the server. The BYE message must contain a CALL-ID field value that is already active with the originator of the BYE request. In other words, a user must be in a call which he wants to terminate.

The OPTIONS message is a null operation, neither establishing nor tearing down a call between a client and a server. However, it does have several other effects, including causing the server to respond OK to a client containing SDP which describes its capabilities. Also, the OPTIONS request message causes the server to execute actions specified by the header fields in the message. For example, an OPTIONS request message can contain an ALSO header field (the ALSO header being described below).

Thus, in conjunction with the request messages, header fields in the messages provide tools for additional services. The most powerful among the header fields is the aforementioned ALSO header field, which contains a URL (preferably, but not necessarily, a SIP URL), which names another entity that the server should call (by sending an INVITE request message to that URL). A plurality of ALSO header fields can be used, in which case the server is directed to send INVITE request messages to each of the named URLs. When the server (which now effectively acts as a client by sending INVITE request messages) sends an INVITE message in response to an ALSO, it uses the same CALL-ID value from the original INVITE request message. In addition, the server inserts a REQUESTED-BY field into the new INVITE request messages, containing the SIP URL of the client that sent the initial INVITE request message that created the instant call.

In response to the ALSO-spawned invitations, responses come back to the server sending the invitations. As a result, the server sends provisional responses back to the client, indicating the result of the respective invitations. When an authoritative response is received for all of the entities listed in the ALSO field(s), the server sends an authoritative response back to the client to report the number of parties in the ALSO field(s) that were finally connected. Since the transmission of such informational responses could delay transmission of an authoritative response, the client can direct the server whether or not the server should send the informational responses or just send an authoritative response indicating the status of the client server connection. This specification is set forth in the CALL-DISPOSITION header field.

The REPLACES header field relates to the BYE request in the same manner that ALSO relates to INVITE. That is, a REPLACES header field indicates that the server should send a BYE request to the parties indicated in the REPLACES header field. According to the present invention, it is permissible to use a wildcard such as "*" as a URL in the REPLACES header field to indicate that the instant connection replaces all other connections with other parties having the same CALL-ID.

The CALL-DISPOSITION header field is powerful in that it expresses client preferences about call handling. For example, the client can indicate that a call should not be forwarded, or that a call should be queued if the callee is busy, thereby implementing a type of camp-on service. A disposition of "status" asks the server to return informational responses about the status of the ALSO invitations.

With the foregoing "building blocks," a broader variety of services can be constructed, such as, without limitation, call forwarding, user location, call transfer and call conferencing.

Call Forwarding

In general, call forwarding includes call forwarding busy, call forwarding no answer, and selective call forwarding. Also, 800- and 900-number services are other examples of call forwarding. SIP generalizes call forwarding to these and any other observable condition, result of user location query, or user preference(s). User preference, for example, can be expressed as a rule table or by a manual response (clicking on a Do Not Disturb button).

A location to which a call is to be forwarded can be determined in a number of ways according to the present invention. First, a SIP user agent can let the SIP server of a domain know of its presence with a REGISTER message. Other methods include the Finger protocol, database accesses (for example, PSTN Intelligent Network databases), or a query multicast on a local network.

All call forwarding functions are usually started with the CONTACT header field, sent in the 300-class response to an original INVITE request message. The CONTACT header field contains possible destinations to which a call should be forwarded. The callee's user agent server or a server can send a redirection response based on any number of factors, such as the identity of the caller, the time of day, or the availability of the callee. When the decision to send a redirect response is made at the user agent end, the decision logic can be programmed as desired, including with or without user interaction. When the decision is made by a redirect server, the decision can be made based on local policy at the redirect server, and by user specified preferences. In particular, the user specified preferences are indicated by uploading a simple call processing directive function to the SIP server. This upload is accomplished by using the SIP REGISTER message. As SIP messages can contain any MIME type, the REGISTER message contains the directive, expressed as some type of script. When a call arrives for that user, therefore, the SIP server executes the script to arrive at a decision. This is much like the operation of the PSTN Intelligent Network, except the features are exposed to clients in a simple and scalable manner here.

According to the present invention, the caller invites the addresses listed in the CONTACT header(s). The CONTACT header, as mentioned above, contains additional fields which can help a caller decide which address to use. These decisions can be automated or made through user interaction.

Since URLs in the CONTACT header fields can be any type of URL (i.e., not just a SIP URL), calls can be forwarded between communication domains, such as to a regular PSTN phone number, a web page for further information, an RTSP URL for an answering machine, or a mailto: URL to leave an email message.

The redirect mechanisms discussed here, when used several times, enable several forwarding functions ranging from simple forwarding to personal mobility calling (i.e., whereby a callee can be reached at a single address regardless of the terminal being used).

For example, a subscriber Alice Smith may have a "lifetime" address with a professional organization, such as alice@ieee.org. When Alice Smith changed her job, she notifies the organization in charge of domain ieee.org to forward her calls to alice@employer.com. The SIP server at employer.com has access to the personnel database and forwards calls on to Alice Smith's home. Alice Smith, in turn, programs her home computer to forward incoming calls to a wireless laptop computer she takes to university classes that she attends, at the address alice@columbia.edu. If she is disconnected (at her laptop), then one of the alternate addresses offered in the CONTACT header field may be a pager URL such as pager: 1-800-BEEPER?PIN=12345.

Of course, sometimes a first user desires to actually locate a second user and what media could be received that that location, but without making a call. Such a user location service can be invoked by sending an OPTIONS request message to the user being sought, instead of an INVITE request message. The same set of forwarding and redirect functions are available as with the INVITE request message, but no call is actually set up.

Reach Preferences

Whereas existing telephony signaling protocols typically only support invitations of a single individual, it is a particular goal of the present invention to allow either calls that reach the first available individual from a group (in a manner similar to automatic call distribution (ACD)), or that reach a group of callees (e.g., an entire department). To simplify error reporting and the client state machine, each call is limited to reaching a single individual, either through unicast or multicast.

There is one exception to the foregoing, however, namely using SIP to distribute announcements of scheduled events, where recipients are prohibited from generating responses.

The desire to reach the first available individual in a group is generally known as "reach first," and the desire to invite an entire group is generally known as "reach all." In both instances, the destination user name is actually the name of a list of individual addresses which is to be resolved by the server. List names are similar to individual addresses, in the form of, for example, sales@acme.com. It is appreciated that a user cannot readily discern whether an address is a list name or an individual address. However, by default, a caller expects a single individual to answer a call, whereas reaching a group (i.e., a list) requires explicit setting of a flag in the CALL-DISPOSITION header field.

In a "reach all" call, the caller indicates the desire for a group call by setting the "all" flag in the CALL-DISPOSITION header field in the caller's invitation. Reach all service is then implemented in two parts. First, the caller sends an invitation to the named server. The server returns a "multiple choices" (300 class) response and enumerates the members in the target list in ALSO header fields. (It is noted that CONTACT headers refer to multiple possible locations of an individual, whereas ALSO headers list different individuals.) Therefore, using the normal function of ALSO, as discussed above, the caller simply invites each listed individual with the same call identifier. It is the caller's decision whether to set up a mesh or a multicast group. For a mesh, the caller includes ALSO with the group address in the invitation, so that ever group member goes through the same resolution process. Since each member uses the same call identifier, a callee that has rejected an earlier invitation from another group member will not be bothered again.

Reach first calling appears in ACD systems, as noted above, and also in residential services where a single number can ring at two different locations (a primary residence and a vacation residence, for example).

Call Transferring

Several types of call transfer services are possible. It is irrelevant whether the caller or callee initiates the transfer.

The first and simplest transfer is a blind transfer. For example, a user A is in a conversation with a set of users $B_1$ (i∈1 ... n). A wants to disconnect from the call and as user C to connect with users $B_1$ instead. The transfer is "blind" because A does not need (and/or want) confirmation of whether the transfer of the call to C is successful. To implement this kind of transfer, A drops all users $B_1$ (with BYE) and names C in the ALSO header. Therefore, users $B_1$ invite C in the usual manner. Except for the fact that the REQUESTED-BY header field indicates A, the call appears in all respects normal to C.

If desired, A can ask to be informed about the status of the call by suitably setting the CALL-DISPOSITION flag. However, blind transfers are inherently limited in that even if the transfer to C is not successful, the originating party (in this case, A) is inevitably disconnected.

Figure 7:
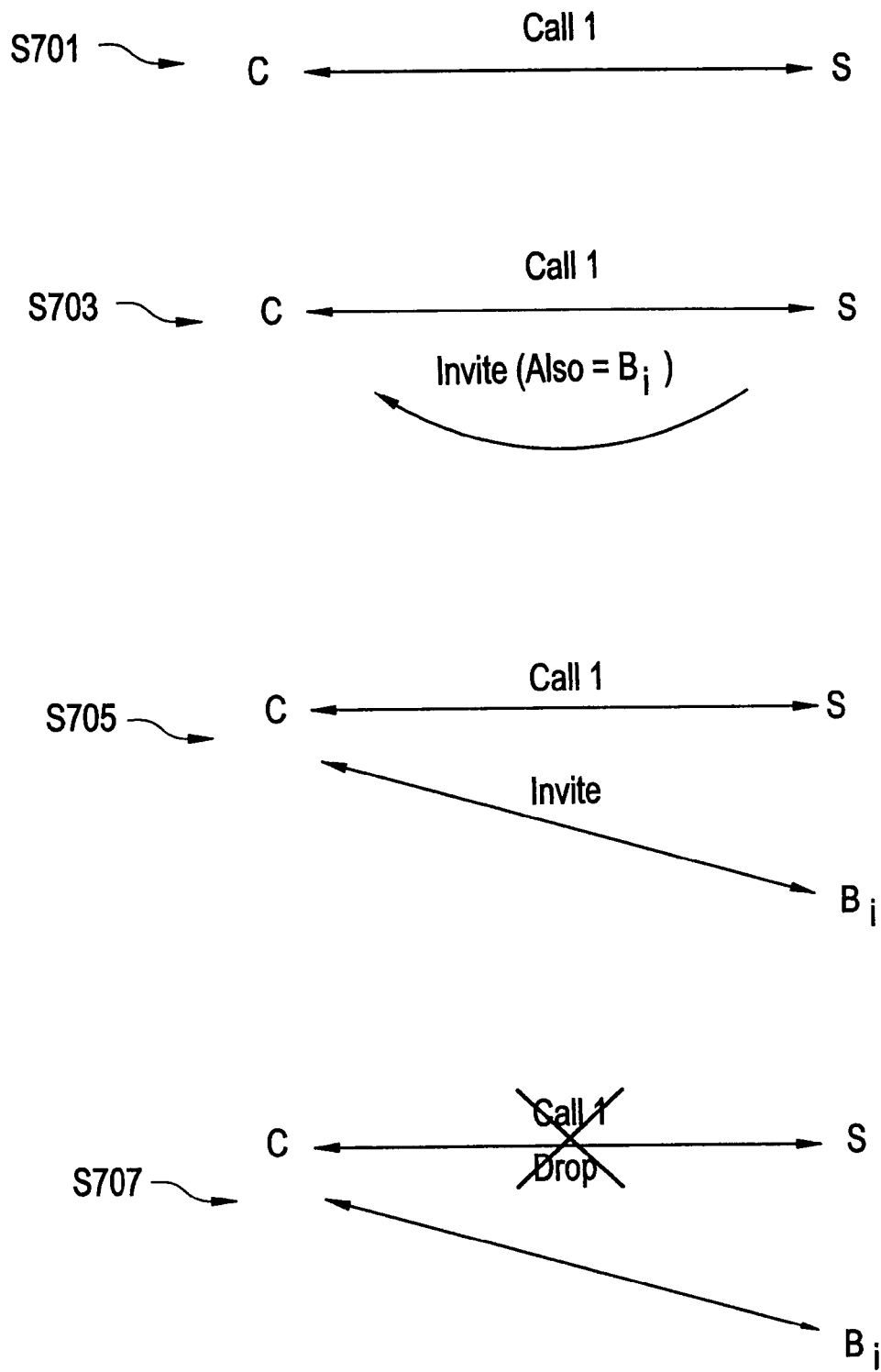
FIG. 7 illustrates a call transfer according to one embodiment.

To address the issue of possible transfer failure concurrent with automatic disconnection of the originating party, a "make before break" approach is desirable. In this case, the transfer is completed before the originating party is disconnected. In effect, the party initiating the transfer asks the other original call party to call the transfer destination. For example, with reference to FIG. 7, a customer C is in a conversation with a secretary S at step S701. S wants to transfer C to boss $B_1$ (or boss $B_2$) if $B_1$ is unavailable. Thus, at step S705, S: 1) invites C, using the same call identifier as the initial call, 2) sets ALSO to $B_1$, and 3) sets CALL-DISPOSITION to "status." This causes C, at step S705, to invite $B_1$ with REQUESTED BY set to S. If $B_1$ is busy, the "busy" response is echoed to S. S, knowing that $B_1$ is busy, can instead INVITE C with ALSO set to $B_2$. (not shown). Once the C-$B_2$ call (or C-$B_1$ call) is set up, S can drop C in step S707. It should be noted that this arrangement is transparent to $B_1$ and C.

Figure 8:
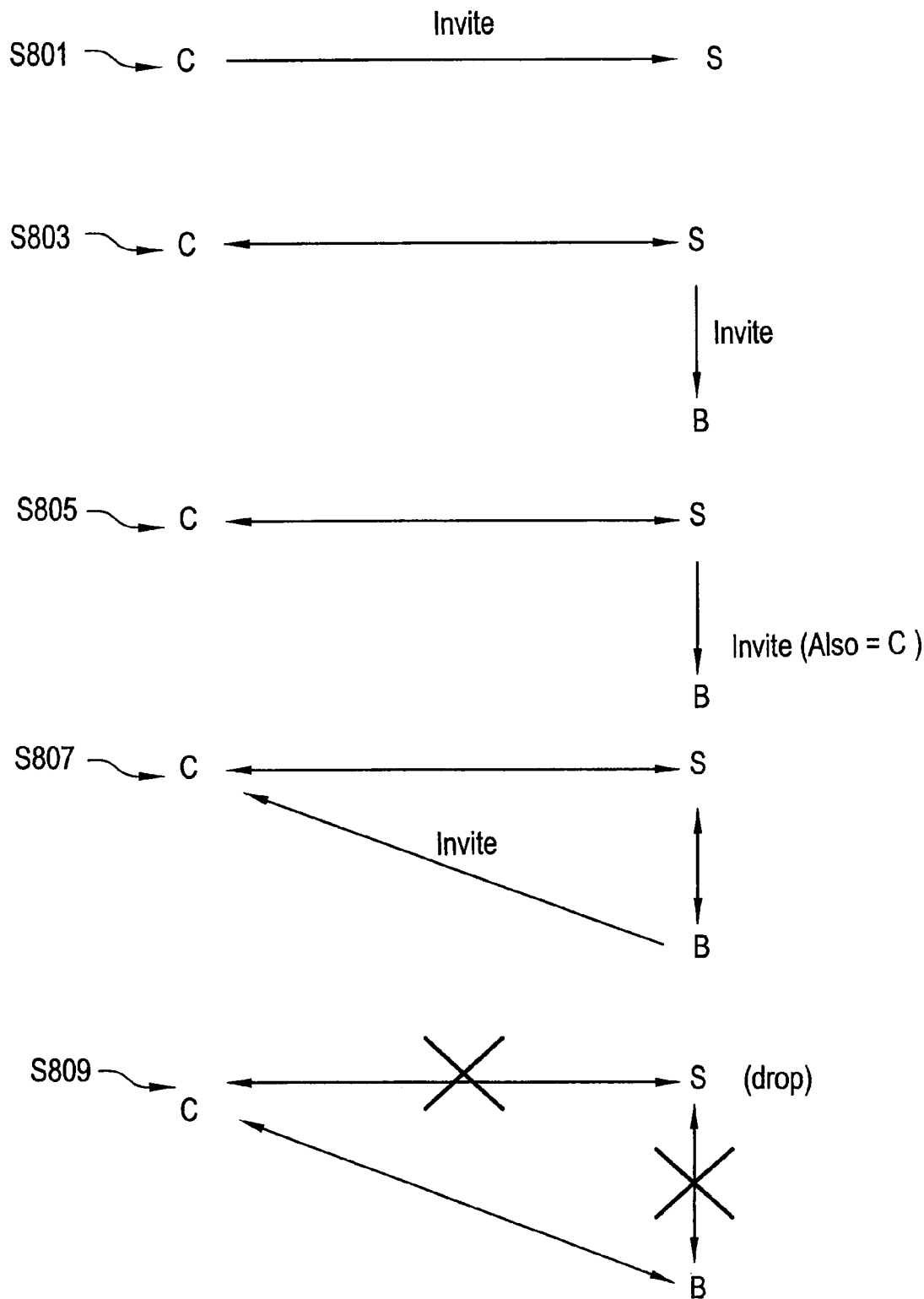
FIG. 8 illustrates a call transfer according to another embodiment.

Another form of transfer is an operator-assisted call transfer service. This transfer will be described with respect to FIG. 8. The transferring user (i.e., the operator, such as secretary S) wants to confer with the transfer recipient (e.g., boss B) to confirm that the transfer of the caller (customer C) is acceptable to B. Also, S wants B to initiate the call to C. Thereafter, S can either stay or leave the call.

Accordingly, in step S801, C invites S (initially), and S invites B to discuss transferring C to B in step S803. If B accepts, then S invites B again in step S805, but with ALSO set to C, the call identifier of the C-S call, and CALL DISPOSITION set to "status." As discussed above with respect to FIG. 7, this will cause B to INVITE C in step S807. S can thereafter leave the conference by dropping C and B as shown in step S809 (leaving C connected with B), may terminate C (but remain connected with B), or may remain in the call with both C and B in a three-way call.

An autodialer (which may be a computer driven dialing device) is a variant of an operator-assisted call transfer service.

An autodialer A takes the place of the operator (such as secretary S above), and calls a potential customer C. After C answers, A then calls a third user, such as a telemarketer T. Upon successful connection, A wants to connect T and C and then leave the call.

One example of how this can be done is A invites C. If C accepts, then A invites T ALSO C and sets CALL DISPOSITION to "status." Accordingly, T calls C using the same call identifier as the A-C call. This causes C to treat T as a new party and therefore accepts T. The response from T to A indicates that the T-C call is successful, so A leaves the call by dropping T and C. T and C are therefore connected.

There are other ways to implement this service, recalling that a prior problem with implementation has been C "seeing" A, then A and T, then just T. Accordingly, this transition can be made effectively instantaneously (i.e., transparently) by having A INVITE C. When C answers, A invites T ALSO C. Accordingly, T invites C but with REPLACES A. C then accepts the call (since it is just adding a new party to an existing call) and immediately drops A. By using the REQUESTED BY header field, A can distinguish between C actually talking to A versus an immediate disconnection between C and A.

User Presence Notification

Another concept which is useful according to the present invention is that of a "buddy list," which generally informs a user when another person (i.e., a buddy) is on-line and available for communication. In other instances, a user may wish to be notified of an acquaintance's presence on-line, at which point the decision can be made whether to communicate. A final example is to associate the presence or absence of individuals in a group, whereby, for example, the presence of a meeting quorum can be determined.

A willingness of a party to communicate can be detected automatically or manually. Examples of automatic detection include computer keyboard activity, passive infrared occupancy sensors, chair pressure mats, or the presence of speech.

Two new request messages are applicable here: SUBSCRIBE and NOTIFY. The SUBSCRIBE request is sent from a user to a server, asking to be notified when a certain other user logs on or off of the server. The NOTIFY request is sent from the server back to the subscribing user to indicate an event, such as when the certain other user logs on or off of the server.

Like the OPTIONS request, the SUBSCRIBE and NOTIFY requests have the same reliability mechanisms as other non-INVITE requests. The SUBSCRIBE request can be cancelled by a CANCEL if it has not yet been responded to, or terminated with a superceding SUBSCRIBE request which indicates that the client does not want to receive notifications. A SUBSCRIBE request is also valid for only a finite period, as indicated by the EXPIRES header field contained in the SUBSCRIBE request.

A clear problem with the buddy list schema is the scaling of registration and notification for large domains. However, there are at least two ways to address this issue. First, registrations and notifications could all go to a single server that then redirects both according to some suitable algorithm. Another alternative would be to embed scaling into name resolution, so a client would count the number of DNS entries with equal priority for the SIP registrations server, such as n, compute a hash h across the user name, and then pick the h (mod n)th server.

Multiparty Conferencing

Another service that is possible is multiparty conferencing, in a variety of scenarios. These include multicast conferences, bridged conferences, and full-mesh conferences.

In a full-mesh conference, each participant sends media data to every other participant and mixes the media from all other participants locally. While network multicast is more efficient for multi party conferences, a full-mesh may be appropriate for, for example, three-party calls or where a bridge or multicast is simply not available. If DVMRP is used as a multicast routing protocol, small groups are very inefficient because packets will periodically broadcast to the entire Internet. Also, it is much easier to eavesdrop on a multicast session (such as a lecture). A single SIP conference can combine multicast, full-mesh and bridge. Most importantly, these services are all available using only request messages and header fields as discussed above.

The simplest example is a dial-in bridge. In this scenario, users dial into a number which represents a bridge. The bridge mixes the media from all of the users connected to it, and then returns it to each user. In SIP, such a bridge is represented by a SIP URL like any other (e.g., sip:conf3224@mcus.com). The caller may not necessarily even be aware that the URL is a bridge. Each user invites the bridge, and the acceptance response from the bridge indicates the media that the bridge can understand and the port number to which data should be sent, as with any other call. All users who send an INVITE to the same URL are considered part of the same conference. Their respective media is mixed, and the result is sent to each user in accordance with their respective limitations.

RTCP may be used to learn about what other parties are in the conference, and the pass around notes (such as far end mute indications) for simple conference functions.

By way of example, if A, who is part of a bridged conference at M, would like to call B outside of the bridge, and then invite B into the bridged conference. To do this, A invites B. After A and B connect and talk, A invites B again (using the same call identifier) with ALSO set to M. It should be noted that A's SIP application does not know (and does not need to know) that M is actually performing a bridge function. In response to the ALSO set to M, B sends an INVITE to M, including a REQUESTED BY A. This lets M know that A invited B to join the bridge, so that it is possible that A is still connected to B directly (not through the bridge). To change this, M invites B, including REPLACES A, which causes B to drop A.

If the client does not use REQUESTED BY, then the bridge has no way to know which user to place in the REPLACES header. To deal with this case, the bridge can be made to use REPLACES*, which globally tells B to disconnect from any mesh outside of the bridged conference.

For a full-mesh conference, a participant gets a new participant N to join the mesh by sending N a list of all the other known participants in the mesh in an ALSO header field. In a more specific case, each existing party that N calls could list the participants known thereto, in order to repair partially connected meshes.

In general, however, multicast conferences use network resources more efficiently than meshes and bridges. To transition from full mesh to multicast, a user A obtains a multicast address, and invites all other users in the conference, with the invitation containing an SDP description which indicates that A wishes to receive its media on the multicast group. Other endpoints which are multicast-capable reply with a 200-class response, and others that are not multicast-capable reply with a 600-class response. This allows A to know from which users it can expect to receive data through multicast, and which through unicast. Participants which are multicast capable treat the invitation as an opportunity to send a similar invitation themselves. As each participant in the conference sends a multicast invitation to each other, the participants progressively learn which participants can receive on the multicast group and the media capabilities of each participant in the multicast group. Those who cannot receive multicast will continue to receive unicast from each of the other participants. Furthermore, since each participant knows the media capabilities of those receiving from the group, each can send using codecs from the commonality of those capabilities.

If user A wants to invite new participant B into the conference, the operation therefor is just as if the conference were full-mesh. A invites B with the ALSO header field including the other participants in the conference. The SDP in the invitation contains the multicast address, and the media capabilities of A. If B is multicast capable, then B replies with an SDP description echoing the multicast address, and indicating its own media capabilities. If B is not multicast capable, then it returns an error code that indicates this. A then resends the invitation including the unicast address. In response to the ALSO header, B invites the other participants into the conference, indicating multicast or unicast in the SDP as appropriate.

Even though the above-described conference is multicast, it is still tightly coupled, in that when a new participant is invited to join, the new participant must explicitly invite itself with each existing participant. This does not scale well to very large conferences. To address this problem, a participant who wants to invite a new user at any point may switch to a loosely coupled conference mode, in which A invites B (as before), but omits the ALSO list. B eventually learns about the other group members through RTCP or other media-specific membership announcement mechanism.

This loosely coupled conference model scales better since new members need not know anything about the other members in the conference. However, the new member cannot participate if it is not multicast capable, and it will not be able to communicate with those conference participants who were still connected with a unicast mesh. Note that the decision to switch from tight coupling can be made independently by each participant, without any synchronization therebetween.

To switch from a full mesh to a bridged conference, a user A in the conference locates a bridge B by known means and methodology, and invites the bridge B with ALSO listing the other conference participants (similar to the call transfer example above). As the bridge works its way through the invitation list, it includes all successfully bridged members in the REPLACES header field sent to new invitees. Any participant may then invite new members to the conference in the same manner as for the dial-in bridge described above.

Except for the initiating party and the bridge, none of the conference participants need know how to interact with the bridge. The participants all transition to a bridge as a natural consequence of the behavior defined by the ALSO and REPLACES header fields. There is also no disruption of the conference. The result of the transition may well be a mixture of bridged and meshed conference.

Multicast Signaling

SIP also contemplates client requests sent by multicast. Some situations where this could be useful:

1. A client wants to invite a group, represented by a single identifier (friends@isp.com) which maps to a multicast address. Each member of the group listens to the address, and therefore can receive invitations. This is an example of a wide area reach all application.

2. A client wants to invite members of a department to a conference, without having to track of the individual department members. It would be efficient to send an invitation to a local multicast group representing the department. This is an example of a local area reach all application.

3. A researcher wants to speak to a system administrator, but does not know which one is available. Instead of calling each one in sequence, the client can multicast an invitation to which the first available administrator responds. This is an example of an any-cast, or a local area reach-first application.

4. A client wants to speak to a member of a board of directors of a club, without regard as to which one in particular. The client multicasts an invitation, and a single director responds. This is an example of a wide area reach-first application.

5. A client wants to advertise a multicast session, inviting any users who are listening to join the session. The client does not want direct replies to the invitation. This is an example of a wide area advertise application.

In order to scale reach-all and reach-first applications for both local and wide area usage, some basic rules and protocol mechanisms for multicast usage are defined. Since many parties may send SIP messages to a multicast group (particularly for an advertise application), clients must implement a back-off algorithm before sending a message. This is called reconsideration and allows for fair distribution of bandwidth among sends in a multicast group with a minimal amount of state storage or complexity. Before a client sends, it listens to the group to see if anyone else is sending. If so, it reschedules its transmission of the request based on the number of other senders heard sending. For advertising applications, it is desirable to send the message periodically. Reconsideration defines the mechanism by which each client determines the period for message retransmission.

Once the message is multicast, there must be some indication of whether it is to reach all, reach first, or advertise. This is indicated in the CALL DISPOSITION header field.

For advertising, the servers which receive the request do not respond. Since the request is an INVITE message with a multicast group listed for the conference, the servers can join the group immediately and participate in the session.

For reach first, we desire just one response (i.e., the first response) from among all recipients of the invitation. This is the same as the "NAK-supression problem" known in reliable multicast.

Therefore, when a server receives a multicast invitation with a reach-first disposition, the server waits a random amount of time T, and then multicasts a response. Should the receiver hear another server respond before sending its own response, it cancels its own response before time T elapses. If multiple servers send responses back to the group, then the one with the lowest unicast address is considered the "winner" in terms of having been first. To acknowledge this, the client sends its ACK message to the multicast address to ensure that all participants have the same idea of who was first, listing the winner in the TO header. The winner responds to this message with a unicast, not multicast, response.

In networks with many servers listening to a multicast address, and where network delays are large, additional means are necessary to reduce the response flood. To do this, the random time variable T is not distributed uniformly (like in IGMP and SRM) but rather has a skewed distribution. The skew operates to make it more likely that a response is sent later rather than earlier. This allows response to be sent only sporadically in the beginning, with the response rate increasing over time. However, since a response suppression algorithm is used, this behavior is desirable, since the bulk of users towards the end of the distribution will never send because their responses are suppressed.

For reach all, the same reconsideration algorithm is applied to the responses. Since the client wants to receive all of the responses, a suppression algorithm is therefore inappropriate. Reconsideration will each server to send a response, but will distribute them uniformly over time. Furthermore, a variation of the reconsideration algorithm called unconditional reconsideration is particularly effective for preventing floods of packets when many users send a response simultaneously, as is likely in this case. ACK and the response which result therefrom are also sent in this manner. This allows a client to establish a signaling relationship with all of the members of a multicast group, in a scalable fashion.

Using multicast invitations is a logical step in growing a conference beyond the multicast-media conferences discussed hereinabove. As the number of participants becomes very large, a member can multicast an invitation with CALL DISPOSITION set to "advertise." This allows potentially thousands of members to join. SIP therefore provides a flexible framework for signaling for both small and very large conferences alike, allowing for migration between the two. There is therefore no need for a separate announcement protocol like SAP, although the style of user interaction may be different. For advertising, for example, it is likely that these would only be listed in some temporal or subject ordering, rather than by alerting recipients.

Call Holding and Call Muting

The mechanisms described above also support a range of call hold and call mute services. Near end mute, where a client continues to receive media but does not generate any requires no protocol assistance. To implement far end mute, a participant must send an INVITE to another participant indicating a null set of receive capabilities for any media. This will cause the other participant to cease sending any of the specified media, thereby causing a mute.

Putting another user on hold is trivially supported by stopping the sending of media to that user. RTCP can be used to send a note, such as "holding . . ." to assure the other user that they are only holding and that the connection is still in place. More interesting variations are possible, such as sending another INVITE indicating a multicast address. This multicast address could be fed by a media server streaming background music as is common in, for example, elevators. Since SDP can contain pointers to the RTSP content, it is even possible to give users on hold some degree of remote control over the music being streamed.

Internet Telephony Integration with Other Multimedia

Lastly, since Internet telephony shares protocols and structures with other Internet multimedia services, it is of interest to explore combinations of services that span several of these. In particular, RTSP is of particular interest for use with SIP. RTSP's role is to control the delivery of stored multimedia content, including precise control of playback and recording suitable for remote digital linear editing.

Perhaps the best example is voice mail. Instead of treating voice mail as a special case service for telephony, we can treat it as a recording/playback service controlled by the Internet telephony end system. In the most direct approach, a SIP server sends a redirect response back to the client. The CONTACT header field contains an RTSP URL. The client then communicates with the RTSP server, recording a message. It follows that the client must understand RTSP.

As an alternative, the SIP server can return a SIP URL which points to a specialized voice mail server. This voice mail server answers SIP invitations and establishes an actual SIP session with the caller. The voice mail server can then send RTSP commands to the RTSP server to play the outgoing message, and record whatever media is received from the caller.

After recording an incoming message, the recording can be made available to the recipient in several ways.

1. The server can mail the multimedia file as a MIME attachment to the recipient, so that it is integrated with the user's email and can be filed, forwarded, and replied to. (Again, as mentioned at the outset, the use of email addresses for SIP is useful here.)

2. The server can mail an RTSP URL to the recipient, pointing particularly to the recording, avoiding the mail transmission of possibly large multimedia files.

3. The server can mail an HTTP URL to the recipient. This HTTP URL actually points to a Java applet which contains a user interface and RTSP implementation that contacts the media server. This is similar to the approach in #3 above, but avoids the need for the user to even have an RTSP implementation plug-in in their mail reader.

4. The server can transfer the message to a "traditional" telephony voicemail server so that a user can access voicemail messages in an integrated fashion.

RTSP can also be used for recording and playback of conferences. A conference participant can invite a SIP-speaking RTSP server into an existing conference, so as to appear as just another conference participant. Alternatively, for multicast conferences, an RTSP server can simply be given the same session description as was used for invitations.

Thus, while there have been shown and described and pointed out fundamental novel features on the invention as applied to preferred embodiments thereof, it will be understood that various omissions and substitutions and changes in the form and details of the devices illustrated, and in their operation, and in the method illustrated and described, may be made by those skilled in the art without departing from the spirit of the invention. For example, it is expressly intended that all combinations of those elements and/or methods steps which perform substantially the same function in substantially the same way to achieve the same results are within the scope of the invention. It is the invention, therefore, to be limited only as indicated by the scope of the claims appended hereto.

What is claimed is:

1. A method of transferring a call made over a network, comprising:

receiving, at a first receiving user, a call over the network from an original calling user such that a connection is established between the original calling user and the first receiving user;

sending a request over the network from the first receiving user to the original calling user that requests a communication device of the original calling user to call a second receiving user designated in the request;

disconnecting, at the first receiving user, the connection with the original calling user; and receiving, at the first receiving user, an indication over the network that the original calling user and the second receiving user have established a connection; wherein the disconnecting step is performed in response to the receiving an indication step.

2. The method of claim 1, wherein the sending step sends the request such that the request requests a communication device of the original calling user to call a second receiving user designated in the request and to send the indication if the original calling user and the second receiving user have established a connection.

3. A method of transferring a call made over a network, comprising:

receiving, at a first receiving user, a call over the network from an original calling user such that a connection is established between the original calling user and the first receiving user;

sending a request over the network from the first receiving user to a second receiving user that requests a communication device of the second receiving user to call the original calling user;

disconnecting, at the first receiving user, the connection with the original calling user; and receiving, at the first receiving user, an indication over the network that the original calling user and the second receiving user have established a connection; wherein the disconnecting step is performed in response to the receiving an indication step.

4. The method of claim 3, wherein the sending step sends the request such that the request requests a communication device of the second receiving user to call the original calling user and to send the indication if the original calling user and the second receiving user have established a connection.

5. A method of transferring a call made over a network, comprising:

calling a first receiving user over the network from an original calling user such that a connection is established between the original calling user and the first receiving user;

receiving a request over the network from the first receiving user that requests the original calling user to call a second receiving user designated in the request;

calling the second receiving user over the network in response to the received request;

establishing a connection with the second receiving user over the network; and sending an indication over the network to the first receiving user that a connection has been established between the original calling user and the second receiving user.

6. The method of claim 5, wherein the received request also requests that the original calling user send an indication if the original calling user and the second receiving user have established a connection.

* * * * *